United States Patent
Ferran et al.

(10) Patent No.: US 9,677,964 B2
(45) Date of Patent: Jun. 13, 2017

(54) APPARATUS AND METHOD FOR AUTOMATIC DETECTION OF DIAPHRAGM COATING OR SURFACE CONTAMINATION FOR CAPACITANCE DIAPHRAGM GAUGES

(71) Applicant: Ferran Technology, Inc., San Diego, CA (US)

(72) Inventors: David J. Ferran, Del Mar, CA (US); Robert J. Ferran, San Diego, CA (US)

(73) Assignee: FERRAN TECHNOLOGY, INC., San Diego, CA (US)

( * ) Notice: Subject to any disclaimer, the term of this patent is extended or adjusted under 35 U.S.C. 154(b) by 101 days.

(21) Appl. No.: 14/634,805

(22) Filed: Feb. 28, 2015

(65) Prior Publication Data

US 2015/0185105 A1     Jul. 2, 2015

Related U.S. Application Data

(62) Division of application No. 14/061,726, filed on Oct. 23, 2013, now Pat. No. 8,997,548.

(Continued)

(51) Int. Cl.
*G01L 27/00* (2006.01)
*G01L 9/00* (2006.01)
*G01L 21/00* (2006.01)

(52) U.S. Cl.
CPC .......... *G01L 27/005* (2013.01); *G01L 27/002* (2013.01); *G01L 27/007* (2013.01); *G01L 9/0072* (2013.01); *G01L 21/00* (2013.01)

(58) Field of Classification Search
CPC ..... G01L 27/00; G01L 27/002; G01L 27/005; G01L 27/007

(Continued)

(56) References Cited

U.S. PATENT DOCUMENTS 2,667,786 A     2/1954  Spaulding
3,953,792 A     4/1976  Fletcher et al.
(Continued)

FOREIGN PATENT DOCUMENTS

DE   102009019055 A1   4/2010
JP       57084327 A    5/1982
JP     2001141592 A    5/2001

OTHER PUBLICATIONS

Thomas, Shane, Authorized Officer of PCT/ISA/US, "Notification of Transmittal of the International Search Report and the Written Opinion of the International Searching Authority," May 16, 2014, 15 pages, which include the "International Search Report," the "Written Opinion of the International Searching Authority," and the "PCT Recordation of Search History," for PCT/US2014/013372.

*Primary Examiner* — Peter Macchiarolo
*Assistant Examiner* — Nathaniel Kolb
(74) *Attorney, Agent, or Firm* — Patterson Intellectual Property Law, P.C.; Jerry Turner Sewell (57) ABSTRACT

A system and a method detect contamination of a diaphragm in a capacitance diaphragm gauge wherein a contaminated diaphragm deflects less in the presence of pressure than an uncontaminated diaphragm. The system and method measure a base pressure. A DC voltage is applied between the diaphragm and a fixed electrode to cause the diaphragm to deflect to simulate an effective pressure. The system and method measure a combined pressure caused by the base pressure and the effective pressure. The system and method subtract the base pressure to determine the effective pressure caused by the static diaphragm deflection. If the measured effective pressure is less than an acceptable effective pressure, the system and method determine that the diaphragm is contaminated.

2 Claims, 5 Drawing Sheets

Related U.S. Application Data (60) Provisional application No. 61/757,922, filed on Jan. 29, 2013.

(58) Field of Classification Search
USPC .................................................. 73/1.58–1.62
See application file for complete search history.

(56) References Cited

U.S. PATENT DOCUMENTS

| | | | |
|---|---|---|---|
| 3,968,694 A | 7/1976 | Clark | |
| 4,823,603 A | 4/1989 | Ferran et al. | |
| 4,887,023 A | 12/1989 | Gimson | |
| 5,396,803 A | 3/1995 | Ferran | |
| 5,515,711 A | 5/1996 | Hinkle | |
| 5,665,899 A * | 9/1997 | Willcox | G01L 27/007 73/1.63 |
| 6,076,391 A | 6/2000 | Broch | |
| 6,357,298 B1 * | 3/2002 | Draxelmayr | G01D 5/24 73/724 |
| 6,837,112 B2 | 1/2005 | Ferran et al. | |
| 7,057,248 B2 | 6/2006 | Sautter et al. | |
| 7,216,048 B2 * | 5/2007 | Wang | G01L 27/002 702/98 |
| 7,308,830 B2 | 12/2007 | Harasyn et al. | |
| 7,377,176 B1 | 5/2008 | Broden | |
| 7,443,169 B2 * | 10/2008 | Bjorkman | C23C 14/54 324/460 |
| 7,841,239 B2 | 11/2010 | Miyashita | |
| 8,760,221 B1 | 6/2014 | Ferran | |
| 9,562,820 B2 | 2/2017 | Gu et al. | |
| 2002/0002856 A1 | 1/2002 | Kenney et al. | |
| 2002/0011095 A1 | 1/2002 | Park et al. | |
| 2005/0223783 A1 | 10/2005 | Spivak | |
| 2006/0161364 A1 * | 7/2006 | Wang | G01L 27/002 702/98 |
| 2007/0120568 A1 * | 5/2007 | Bjorkman | C23C 14/54 324/460 |
| 2009/0128160 A1 | 5/2009 | Chiaburu et al. | |
| 2010/0148293 A1 | 6/2010 | Jain et al. | |
| 2010/0198545 A1 | 8/2010 | Berg et al. | |
| 2011/0271764 A1 | 11/2011 | Lee | |
| 2013/0001550 A1 * | 1/2013 | Seeger | G01L 5/223 257/48 |
| 2013/0233086 A1 | 9/2013 | Besling et al. | |
| 2014/0202254 A1 | 7/2014 | Ferran et al. | |
| 2014/0222362 A1 | 8/2014 | Ferran et al. | |
| 2014/0222363 A1 | 8/2014 | Ferran et al. | |
| 2014/0224027 A1 | 8/2014 | Ferran | |

* cited by examiner

APPARATUS AND METHOD FOR AUTOMATIC DETECTION OF DIAPHRAGM COATING OR SURFACE CONTAMINATION FOR CAPACITANCE DIAPHRAGM GAUGES

RELATED APPLICATIONS

The present application is a continuation of U.S. patent application Ser. No. 14/061,726 filed on Oct. 23, 2013, which claims the benefit of priority under 35 USC §119(e) to U.S. Provisional Application No. 61/757,922 filed on Jan. 29, 2013, which is incorporated by reference herein.

BACKGROUND OF THE INVENTION

Field of the Invention

The present invention is in the field of capacitance diaphragm gauges which measure pressure based on the deflection of a diaphragm.

Description of the Related Art

Absolute capacitance diaphragm gauges (CDGs) measure pressure by sensing the capacitance change associated with deflection of a diaphragm whereby one side of the diaphragm ("the Px side") is exposed to the pressure to be measured (Px) and the other side of the diaphragm is exposed to a sealed reference vacuum cavity in which an ultrahigh vacuum (e.g., less than $10^{-9}$ Torr) has been created prior to the sealing of the reference cavity.

The CDG measures capacitance between a diaphragm and one or more fixed electrodes housed in the reference vacuum cavity. When the pressure on the Px side of the diaphragm is higher than the pressure in the reference vacuum cavity, the diaphragm deflects in the direction of the fixed electrode (or electrodes), which increases the measured capacitance. As the pressure on the Px side of the diaphragm decreases, the pressure differential across the diaphragm diminishes and the diaphragm moves away from the fixed electrode (or electrodes) in the reference vacuum cavity, which reduces the measured capacitance.

As the pressure on the Px side of the diaphragm approaches the pressure in the reference vacuum cavity, the pressure differential across the diaphragm becomes sufficiently small as to be considered as the "zero point" for the CDG. This fixed zero point is established during the calibration of the CDG and is used as a reference in subsequent pressure measurements.

CDGs are commonly used to the measure pressure in vacuum chambers in which thin or thick films of material are deposited on a substrate. One common example of usage is to measure pressure during the deposition of materials onto the surface of silicon wafers during the fabrication of semiconductor devices. CDGs are quite useful in vacuum deposition processes that utilize multiple gasses because capacitance diaphragm gauges are highly accurate and are able to measure absolute pressure independent of gas composition. Unfortunately, the same characteristics of the CDG that enable the CDG to operate in the pressure regimes in which vacuum deposition is typically carried out also make the CDG extremely sensitive to any form of contamination or coating that finds its way onto the surface of the diaphragm. Compounding the problem is the fact that the diaphragm of a CDG cannot be inspected without removing the CDG from the system. Thus, the user of a conventional CDG has no nondestructive way of looking into the CDG to determine whether the surface of the diaphragm has been contaminated by any type of deposition of material on its surface.

Diaphragm contamination or coating can negatively impact the sensitivity and accuracy of the CDG and can also result in a shift in the zero point of the CDG. Several other commonly encountered phenomena can also impact the sensitivity, the accuracy and the zero point of the CDG. Thus, it has heretofore been impossible for a user to detect the occurrence of diaphragm coating or contamination in real time and in-situ. As a result, users of CDGs have attempted to mitigate the chance of diaphragm contamination or coating by elevating the temperature of the diaphragm. While this technique has long been used and has a positive effect, the technique has not eliminated the occurrence of diaphragm contamination or coating. CDGs are being used more frequently in processes, such as semiconductor wafer processing, that are extremely sensitive to minor inaccuracies in the vacuum measurement. Further, the effects of diaphragm contamination or diaphragm coating on the accuracy and repeatability of the CDG are known to be significant enough to impact process results and process yields.

SUMMARY OF THE INVENTION

A need exists to detect the occurrence of diaphragm contamination or coating in real time and in-situ so that the user can take corrective action. The system disclosed and claimed herein is responsive to the need.

An aspect of embodiments disclosed herein is a method for detecting contamination of the diaphragm of a capacitance diaphragm gauge (CDG) that includes a diaphragm and at least one fixed electrode wherein the capacitance between the diaphragm and the at least one fixed electrode is responsive to a pressure applied to the CDG. The method applies a first pressure to the CDG and determines a first pressure value while the first pressure is applied to the CDG. The method then applies a DC voltage between the diaphragm and the at least one fixed electrode to cause deflection of the diaphragm. The DC voltage is applied while the first pressure is applied to the CDG. The method determines a second pressure value while the DC voltage is applied between the diaphragm and the at least one fixed electrode. The method compares the second pressure value with the first pressure value to determine a difference in pressure values resulting from the deflection caused by the applied DC voltage. The method determines that the diaphragm is contaminated when the difference in pressure values is less than an acceptable difference in pressure values. In certain embodiments of the method, the DC voltage applied between the diaphragm and the at least one fixed electrode causes the diaphragm to deflect toward the at least one fixed electrode to increase the capacitance between the diaphragm and the at least one fixed electrode.

Another aspect of embodiments disclosed herein is a contamination detection system for a capacitance diaphragm gauge (CDG). The CDG includes a diaphragm and at least one fixed electrode. The capacitance between the diaphragm and the at least one fixed electrode is responsive to a pressure applied to the CDG that deflects the diaphragm with respect to the at least one fixed electrode. The system comprises a source of a DC voltage and a switch. The switch selectively applies the DC voltage between the diaphragm and the at least one fixed electrode in the CDG. The diaphragm is responsive to the applied DC voltage to deflect the diaphragm with respect to the at least one fixed electrode. A contamination test controller has an output that selective enables the switch and has an input that receives pressure values responsive to the deflection of the diaphragm with respect to the at least one fixed electrode. The contamination test controller compares a first pressure value before enabling the switch with a second pressure value while enabling the switch to determine a difference between the first and second pressure values. The contamination test controller determines the presence of unacceptable contamination when the difference in the first and second pressure values is less than a predetermined pressure difference. In certain embodiments, the system further includes a notification unit coupled to the contamination test controller, which is activated when the contamination test controller determines the presence of unacceptable contamination. In certain embodiments, the DC voltage applied between the diaphragm and the at least one fixed electrode causes the diaphragm to deflect toward the at least one fixed electrode to increase the capacitance between the diaphragm and the at least one fixed electrode.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

The improvements to capacitance diaphragms are disclosed herein with respect to exemplary embodiments of a system and a method. The embodiments are disclosed for illustration of the system and the method and are not limiting except as defined in the appended claims. Although the following description is directed to a particular embodiment of a capacitance diaphragm gauge, it should be understood that the disclosed system and method can be applied to other embodiments of capacitance diaphragm gauges.

Figure 1:
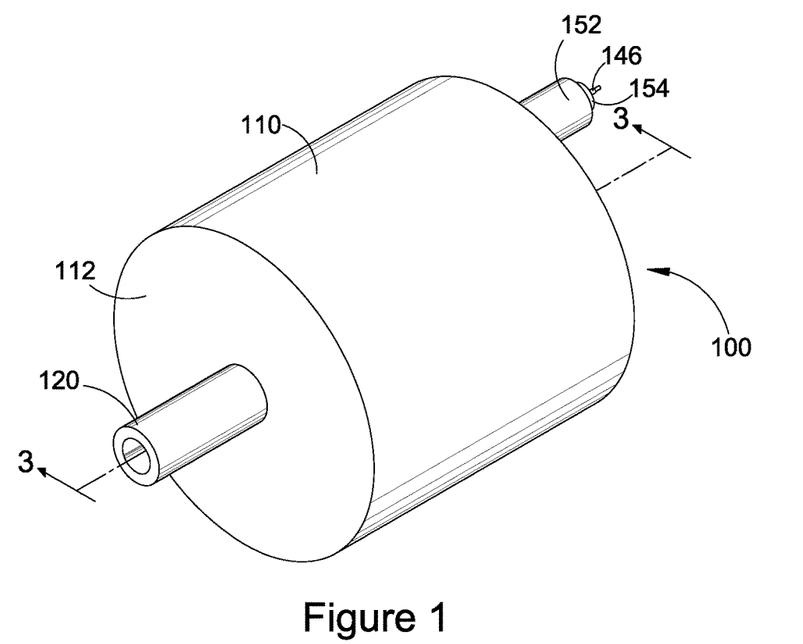
FIG. 1 illustrates a front perspective view of an exemplary capacitance diaphragm gauge (CDG), which is installable into a pneumatic system (not shown) to measure the pressure within the system.
Figure 2:
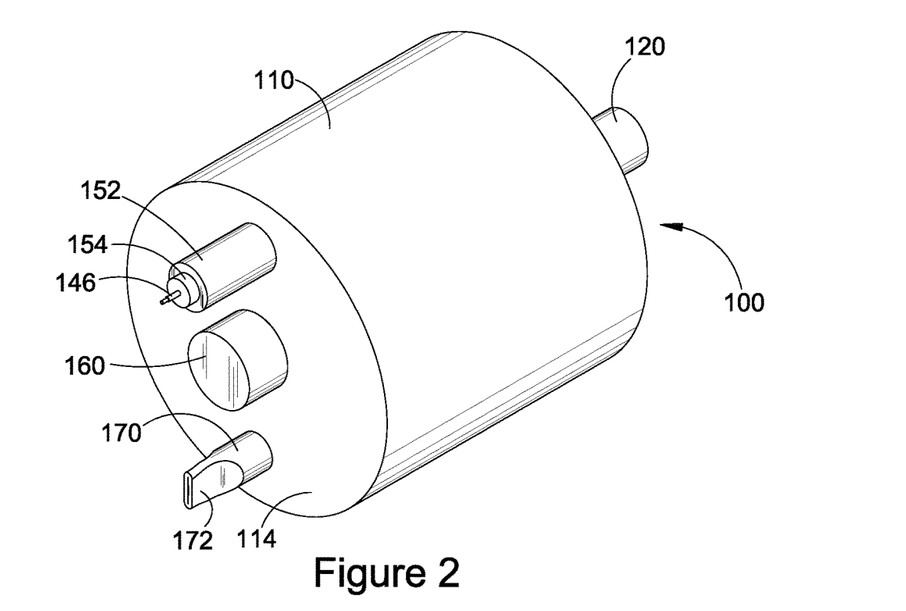
FIG. 2 illustrates a rear perspective view of the CDG of FIG. 1 which is rotated 180° from the view in FIG. 1.
Figure 3:
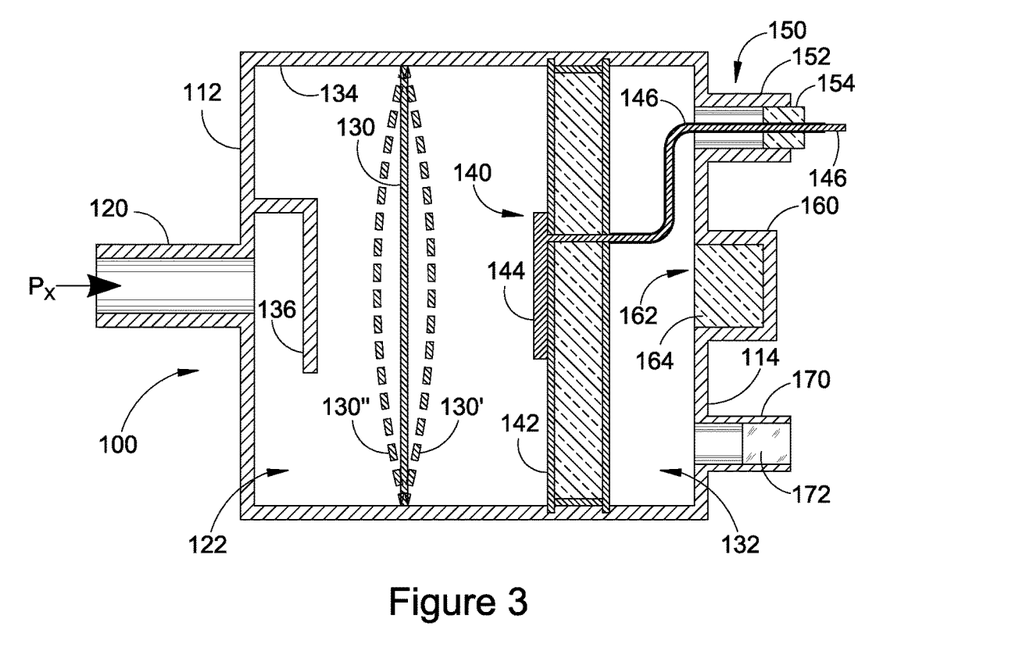
FIG. 3 illustrates a cross-sectional view of the CDG taken along the line 3-3 in FIG. 1, wherein the diaphragm appears undeflected in solid lines and appears in first and second deflected positions in dashed lines.

FIG. 1 illustrates a front perspective view of an exemplary capacitance diaphragm gauge (CDG) 100, which is installable into a pneumatic system (not shown) to measure the pressure within the system. In particular, the CDG is used to measure very low pressures resulting from evacuation of the pneumatic system. FIG. 2 illustrates a rear perspective view of the CDG of FIG. 1 which is rotated 180° from the view in FIG. 1. FIG. 3 illustrates a cross-sectional view of the CDG taken along the line 3-3 in FIG. 1.

In the illustrated embodiment, the CDG 100 comprises a hollow, generally cylindrical body structure 110, which extends between a first end surface 112 (FIG. 1) and a second end surface 114 (FIG. 2). A first cylindrical tube 120 extends from the first end surface. The first cylindrical tube provides pneumatic access to a first inner cavity 122 (FIG. 3) of the CDG. The first cylindrical tube is connectable to the pneumatic system (not shown) to allow the pressure of the system to be applied to the first inner cavity.

As shown in FIG. 2, a diaphragm 130 within the cylindrical body structure 110 separates the first inner cavity 122 from a second inner cavity 132. The diaphragm is sealed around its peripheral edges with respect to an inner surface 134 of the cylindrical body structure so that the first inner cavity is pneumatically isolated from the second inner cavity by the diaphragm. The diaphragm is also electrically connected to the cylindrical body structure, which is electrically connected to a ground reference, as discussed below.

In certain embodiments, the diaphragm 130 comprises Inconel 750 or another suitable material. In certain embodiments, the diaphragm has a thickness that can range from approximately 0.001 inch (0.025 mm) to approximately 0.015 inch (0.38 mm). The first inner cavity 122 also includes a baffle 136 that is positioned between the diaphragm and the first cylindrical tube 120. The baffle reduces the deposition of contaminants onto the surface of the diaphragm that faces the first inner cavity.

An electrode assembly 140 is positioned within the second inner cavity 132 between the diaphragm 130 and the second end surface 114. The electrode assembly comprises a mounting structure 142, which is secured to the inner surface 134 of the cylindrical body structure 110. The mounting structure of the electrode assembly is not sealed around the peripheral edges. Accordingly, both sides of the electrode assembly are at the same pressure within the second inner cavity. At least one electrode 144 is mounted on one side of the electrode assembly mounting structure. In particular, the electrode is mounted on the side of the mounting structure that faces the diaphragm. The electrode is electrically connected through the mounting structure. A conductor 146 extends from the mounting structure to a port 150 that extends through the second end surface 114 of the cylindrical body structure 110. The port 150 includes a second cylindrical tube 152 that extends outwardly from the second end surface. The conductor extends beyond the end of the second cylindrical tube. The conductor extends through a plug 154 that hermetically seals the second cylindrical tube around the conductor.

Although described herein with respect to one electrode on the electrode assembly, one skilled in the art will appreciate that the electrode assembly may include more than one electrode. See, for example, U.S. Pat. No. 4,823,603 to Ferran et al., which discloses two concentric fixed electrodes. U.S. Pat. No. 4,823,603 is incorporated herein by reference.

In the illustrated embodiment, a central portion 160 of the second end surface 114 extends outwardly to form an extended cavity portion 162 of the second inner cavity 132.

The extended portion of the second inner cavity houses a getter 164. The getter functions in a conventional manner to remove small amounts of gas that may be released by the inner surface of the second inner cavity.

A third cylindrical tube 170 extends from the second end surface 114 of the cylindrical body structure 110. Initially, the entire length of the third cylindrical tube is uniformly cylindrical. The third cylindrical tube is connected to a vacuum evacuation system (not shown) to evacuate the gases from the second inner cavity 132 to create a desired low pressure within the second inner cavity. After the evacuation process is completed, an end portion 172 of the third cylindrical tube is crimped as shown in FIG. 1 to seal the second inner cavity to maintain the evacuated condition of the second inner cavity.

As illustrated in the cross-sectional view of FIG. 3, the diaphragm 130 is a thin metallic plate that separates the first inner cavity 122 from the second inner cavity 132. As discussed above, the second inner cavity is evacuated so that the absolute pressure within the second inner cavity is very low (e.g., approximately $10^{-9}$ Torr). The pressure within the first inner cavity is determined by the pressure Px of the system (not shown) to which the first cylindrical tube 120 is connected. When the pressure within the first inner cavity is substantially equal to the pressure within the second inner cavity, the diaphragm will not be deflected and will maintain the substantially flat shape shown by the solid cross-hatched profile (labeled as 130 in FIG. 3). If the pressure Px on the system side of the diaphragm (i.e., the pressure in the first inner cavity) exceeds the pressure in the second inner cavity, the center of the diaphragm will be deflected toward the second inner cavity and the diaphragm will bow into the second inner cavity as illustrated by a first dashed cross-hatched profile 130' in FIG. 3. If the pressure Px on the system side of the diaphragm is less than the pressure in the second inner cavity, the center of the diaphragm will be deflected toward to the first inner cavity and the diaphragm will bow into the first inner cavity as illustrated by a second dashed cross-hatched profile 130" in FIG. 3. In each case, the amount of the deflection will be determined by the pressure differential between the first and second inner cavities. The amount of deflection is also determined in part by the material properties of the diaphragm (e.g., the stiffness of the diaphragm).

As is well known in the art, the diaphragm 130 forms a first, movable plate of a variable capacitor. The electrode 144 on the electrode support structure 142 forms a second, fixed plate of the variable capacitor. When the diaphragm 130 is in the undeflected initial state, the capacitance of the variable capacitor has a first (initial) value determined by the initial distance between the diaphragm and the electrode. When the pressure Px increases, the diaphragm is deflected toward the second inner cavity and thus toward the fixed electrode as illustrated by the first dashed cross-hatched profile 130'. The deflection reduces the distance between the diaphragm and the electrode, which increases the capacitance of the variable capacitor. When the pressure Px decreases, the diaphragm is deflected toward the first inner cavity and thus away from the fixed electrode as illustrated by the second dashed cross-hatched profile 130". The deflection increases the distance between the diaphragm and the electrode, which decreases the capacitance of the variable capacitor. As discussed below, the capacitance is monitored and the increases and decreases in capacitance are used to determine corresponding increases and decreases in the system pressure Px. The CDG is initially calibrated by monitoring the changes in capacitance as a plurality of known values of the pressure Px are applied to the CDG.

Figure 4:
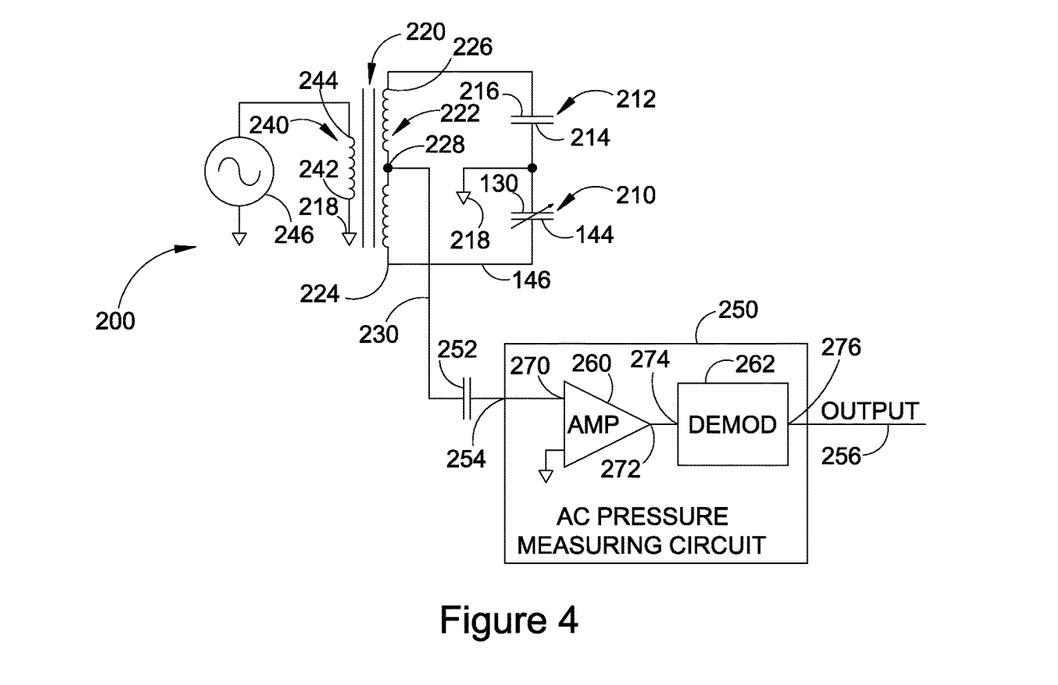
FIG. 4 illustrates a basic pressure monitoring system that monitors that the capacitance of the variable capacitor formed by the diaphragm and the fixed electrode of FIG. 3 to determine the deflection of the capacitor and thereby determined the pressure applied to the diaphragm.

FIG. 4 illustrates a simplified exemplary system 200 for monitoring the capacitance of the variable capacitor formed by the diaphragm 130 and the fixed electrode 144 of FIG. 3. The system comprises a first capacitor 210 and a second capacitor 212. The first capacitor comprises the variable capacitor formed by the diaphragm and the fixed electrode. Accordingly, a first electrode (the diaphragm) of the first capacitor is identified with the reference number 130, and a second electrode (the fixed electrode) of the first capacitor is identified with the reference number 144. The second capacitor is a conventional fixed capacitor. The second capacitor has a first electrode 214 and a second electrode 216.

The first electrode 130 of the first capacitor 210 and the first electrode 214 of the second capacitor 212 are connected to a ground reference 218. The second electrode 144 of the first capacitor is connected to a first terminal 224 of a center-tapped output (secondary) winding 222 of a transformer 220. The second electrode 216 of the second capacitor is connected to a second terminal 226 of the output winding of the transformer. A center-tap terminal 228 of the output winding of the transformer provides a signal output on a line 230.

In the illustrated embodiment, the first electrode (diaphragm) 130 of the first (variable) capacitor 210 is mechanically and electrically connected to the cylindrical body structure 110. The cylindrical body structure is electrically connected to the ground reference 218 when installed in the system having the pressure to be measured, thus providing the electrical connection of the diaphragm to the ground reference. The second electrode 144 of the first (variable) capacitor is connected to the second terminal of the transformer via the conductor 146 of FIG. 3.

In the illustrated embodiment, the capacitance of the second capacitor 212 is fixed. The capacitance of the second (fixed) capacitor is selected to be approximately equal to the initial capacitance between the diaphragm 130 and the fixed electrode 144 (e.g., the initial capacitance of the first (variable) capacitor 210) when the system pressure Px in the first inner cavity 122 is approximately equal to the pressure in the second inner cavity 132 as discussed above with respect to FIG. 3.

The transformer 220 has an input (primary) winding 240 having a first terminal 242 and a second terminal 244. The first terminal is connected to the ground reference 218. The second terminal is connected to a high frequency signal source 246 operating, for example, at a frequency of approximately 50 kilohertz.

The electrical conductor 230 connects the center tap 228 of the output winding 222 of the transformer 220 to an input 254 of an AC pressure measuring circuit 250 via an AC coupling capacitor 252. The AC pressure measuring circuit provides an output signal (OUTPUT) on an output signal line 256.

In the illustrated embodiment, the AC pressure measuring circuit 250 comprises an amplifier 260 and a demodulator 262. The signal on the center tap 228 of the output winding 222 of the transformer 220 is applied to an input 270 of the amplifier via the AC coupling capacitor 252. The amplifier preferably has a very high input impedance so that substantially zero current flows into the input of the amplifier. An output 272 of the amplifier provides an amplified output signal to an input 274 of the demodulator. An output 276 of the demodulator provides the output signal on the output signal line 256. The output signal is responsive to the variations in the capacitance of the first (variable) capacitor 210. Accordingly, the output signal varies in response to changes in the system pressure Px.

The signal generated by the high frequency signal source 246 is applied to the input (primary) winding 240 of the transformer 220. The applied signal is coupled to the secondary winding 222 and induces a high frequency voltage across the secondary winding. The induced voltage is applied across the series connection of the first (variable) capacitor 210 and the second (fixed) capacitor 212. The voltage across each capacitor is inversely proportional to the respective capacitance of the capacitor. Since the capacitance of the second (fixed) capacitor is substantially constant, the voltage across the first (variable) capacitor varies in accordance with the deflection of the diaphragm 130 caused by differential pressure across the diaphragm between the first inner cavity 122 and the second inner cavity 132 of the CDG 100. Because one electrode of each of each capacitor is electrically connected to the ground reference 218, a difference in the voltages across the two capacitors appears as a voltage differential across the output winding between the first input terminal 224 and the second input terminal 226 of the output winding of the transformer.

The voltage differential across the output winding 222 of the transformer 220 causes a voltage to appear on the center tap 228 of the output winding that is referenced to the ground reference 218 and that is proportional to the differences in the capacitance between the first (variable) capacitor 210 and the second (fixed) capacitor 212.

The voltage on the center tap 228 of the output winding 222 of the transformer 220 is applied via the conductor 230 and the AC coupling capacitor 252 to the input 270 of the amplifier 260. The amplifier amplifies the center tap voltage and provides the amplified signal as an output signal on the output 272. The output signal from the amplifier is a time-varying signal at the frequency of the signal source 246 with an amplitude that is proportional to the difference in capacitance of the first (variable) capacitor 210, which varies in response to changes in the pressure differential across the diaphragm 130. Accordingly, the amplitude of the time-varying signal output of the amplifier changes in response to changes in the pressure differential across the diaphragm.

The time-varying signal generated by the amplifier 260 is demodulated by the demodulator 262 in a conventional manner to provide the output signal on the output signal line 256 having a DC voltage level corresponding to the pressure differential across the diaphragm 130. The AC pressure measuring circuit is calibrated to equate the variations in the AC voltage to the absolute pressure (Px) applied to the diaphragm. In one embodiment, the demodulator comprises a synchronous demodulator known to the art.

Figure 5:
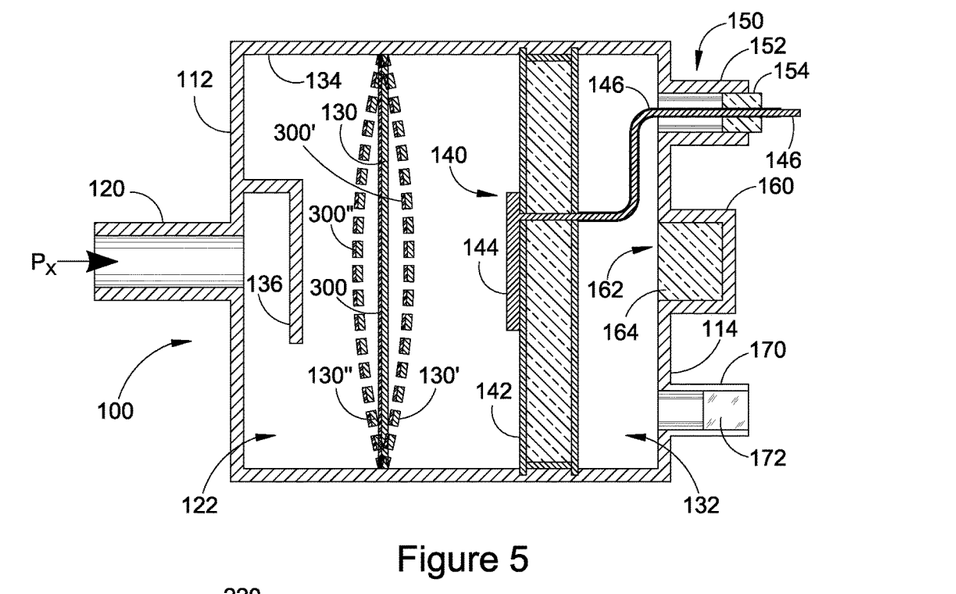
FIG. 5 illustrates a cross-sectional view of the CDG of FIG. 3 with a layer of contamination on the surface of the diaphragm in the undeflected position and the two deflected positions.

FIG. 5 illustrates the problem caused by contamination of the diaphragm 130 of the CDG 100 shown in FIGS. 1-3. In particular, FIG. 5 corresponds to the cross-sectional view of FIG. 3, and like elements in FIG. 5 are identified with the same reference numerals as used in FIG. 3. The result of diaphragm contamination is shown as a thin layer 300 of material deposited on the surface of the diaphragm facing the first inner cavity 122. Although shown as a uniform layer of contamination, it should be understood that the actual contamination on a diaphragm may not be uniform. For example, the effect of the barrier 136 may cause the contamination to be more extensive at the peripheral edges of the diaphragm than at the central portion. The contamination is further represented as a layer 300' on the surface of the deflected first dashed cross-hatched profile 130' and as a layer 300" on the surface of the deflected second dashed cross-hatched profile 130" in FIG. 5. As discussed above, the surface contamination affects the properties of the diaphragm such that, for example, a pressure differential that causes the diaphragm to deflect by a first amount when the diaphragm is new and uncontaminated will cause the diaphragm to deflect by a lesser amount when the diaphragm becomes contaminated. Thus, a change in capacitance caused by the same pressure differential will be less for a contaminated diaphragm than for an uncontaminated diaphragm. Accordingly, a pressure differential that would have produced a particular output signal (pressure reading or pressure value) when the CDG 100 was first installed will produce a different output signal (pressure reading or pressure value) when the diaphragm is contaminated. Although a small amount of contamination will not significantly affect the pressure reading, the pressure reading will become less accurate as the contamination increases. Eventually, the contamination will increase to a level that the pressure reading is no longer sufficiently accurate to be used to control the system into which the CDG is installed. Since the level of contamination cannot be determined from the outside of the sealed CDG, a nondestructive system and method are needed to determine when the contamination has increased to a level that the CDG is no longer sufficiently accurate and the CDG needs to be replaced.

Figure 6:
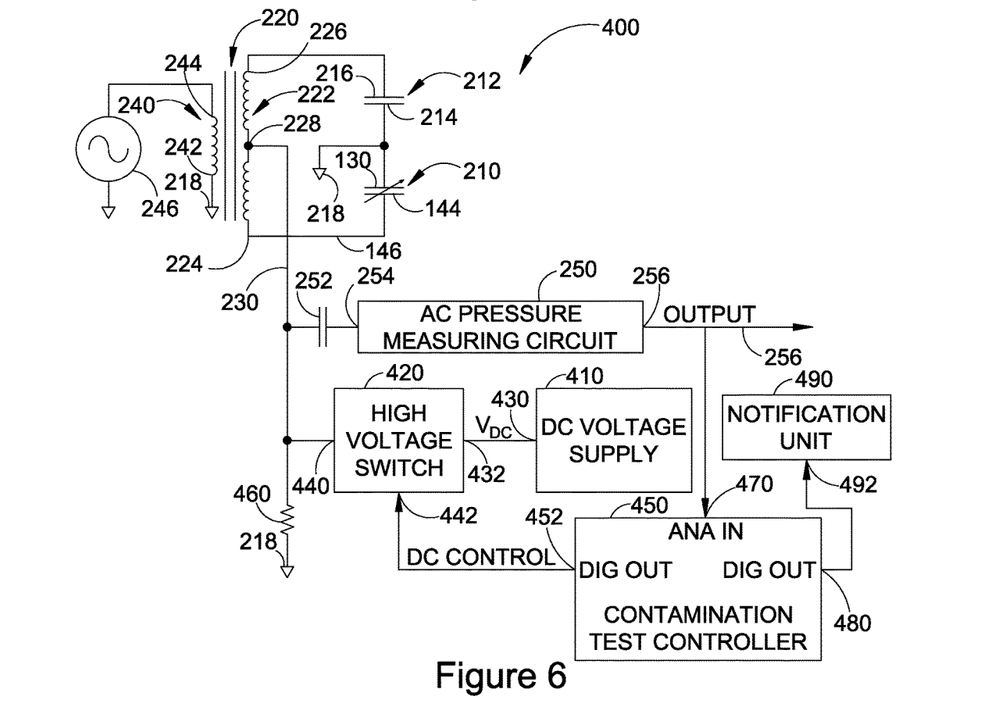
FIG. 6 illustrates an improved pressure monitoring system for monitoring the capacitance of the variable capacitor formed by the diaphragm and the fixed electrode of FIG. 3 when subjected to contamination as illustrated in FIG. 5, the system further including a high voltage source, a voltage switch, a contamination test controller and a notification unit.

FIG. 6 illustrates an improved pressure monitoring system 400 that operates by monitoring the capacitance of the variable capacitor formed by the diaphragm 130 and the fixed electrode 144 of FIGS. 3 and 5 when subjected to contamination illustrated in FIG. 5. The improved measurement system of FIG. 6 includes elements that are described above with respect to the system illustrated in FIG. 4. Accordingly, like elements are identified with reference numbers corresponding to the reference numbers in FIG. 4. The elements of the measurement system in FIG. 6 up to and including the AC pressure measuring circuit 250 are similar to the corresponding components in the previously described measuring system and are not described again in detail. Furthermore, the details of the AC measuring circuit are already shown in FIG. 4 and are not shown again in FIG. 6.

Unlike the measurement system 200 of FIG. 4, the improved measurement system 400 of FIG. 6 includes a high voltage DC power supply 410 and a high voltage DC switch 420. The DC voltage supply provides a DC voltage ($V_{DC}$) of a known fixed magnitude (e.g., 300 volts DC) on an output 430. The DC voltage is provided as an input to the high voltage switch. The DC voltage is selectively provided on an output 440 of the high voltage switch in response to a control signal (DC CONTROL) applied to an input 442 of the high voltage switch. The control signal is produced by an output signal from a digital output (DIG OUT) port 452 of a contamination test controller 450 described below. The output of the high voltage switch is connected to the electrical conductor 230 and is thus connected to the center tap 228 of the output winding 222 of the transformer 220. The output of the high voltage switch is also connected to the ground reference 218 via a bleed resistor 460.

The AC pressure measuring circuit 250 in the system 400 of FIG. 6 operates as described above to measure the AC voltage developed between the center tap of the secondary winding and the common ground and to generate a DC voltage on the output signal line 256 that is responsive to the changes in capacitance resulting from the deflection of the diaphragm 130 caused by the pressure (Px) applied to the diaphragm.

The DC voltage supply 410 and the high voltage switch provide a system and method for testing whether the surface of the diaphragm 130 is contaminated such that the magnitudes of the deflections of the diaphragm in response to pressure changes are no longer sufficiently consistent with the magnitudes of the deflections when the CDG 100 was initially calibrated. When the high voltage switch is enabled by the contamination test controller 450, the DC voltage from the DC voltage supply is applied to the center tap 228 of the output winding 222 of the transformer 220. The DC voltage is coupled through the respective halves of the output winding to the respective first electrodes 144, 214 of the two capacitors 210, 212 connected to the first end terminal 224 and the second end terminal 226, respectively, of the output winding. The DC voltage is isolated from the AC pressure measuring circuit 250 by the decoupling capacitor 252 at the input to the AC pressure measuring circuit so that the DC voltage does not affect the operation of the AC pressure measuring circuit.

The DC voltage applied to the center tap 228 of the output winding 222 of the transformer 220 is applied across the first capacitor 210 between the first end terminal 224 of the transformer and the ground reference 218. The DC voltage is also applied across the second capacitor 212 between the second end terminal 226 and the ground reference. The DC voltage applied across the second (fixed) capacitor does not affect the capacitance of the capacitor. In contrast, the DC voltage applied to the second (variable) capacitor 210 produces an electrostatic force that causes the diaphragm 130 to deflect by an amount responsive to the DC voltage. The applied DC voltage causes the diaphragm to deflect into the second inner cavity 132 toward the fixed electrode (or electrodes) 144, which increases the capacitance in a similar manner to the increase in capacitance caused by an increase in the applied pressure (Px). Preferably, the DC voltage is applied when the applied pressure (Px) is set to a "system zero point pressure" that may be unique to the system in which the CDG is installed. For example, the system zero point pressure may be obtained when the system is pumped down to a known base pressure before beginning a processing step. The system zero point pressure may be in the same general pressure range as the factory zero point pressure applied during the original calibration of the CDG (e.g., approximately $10^{-9}$ Torr in one embodiment).

While the pressure Px is pumped down to the system base pressure, a first pressure reading is taken to establish a current base pressure measurement value. The current base pressure measurement value is represented by the polarity and amplitude of a first output signal on the output signal line 256 of the AC pressure measuring circuit 250. The output from the AC pressure measuring circuit is provided as an input to the contamination test controller 450. Then, the switched DC voltage is applied via the high voltage switch 420, and a second pressure reading is taken to obtain a second pressure measurement value. Thus, the AC pressure measuring circuit generates a second output signal having a polarity and magnitude corresponding to the combined effects of the system base pressure and the "effective pressure" caused by the deflection induced by the applied DC voltage. The second output signal is also provided to the contamination text controller. The contamination test controller determines a difference between the second pressure reading and the first pressure reading as the effective pressure resulting from the deflection of the diaphragm caused by the DC voltage. The effective pressure caused by the application of the high DC voltage is also determined at the time of the original installation of a new CDG into a system when the CDG 100 has an uncontaminated or uncoated diaphragm. The contamination test controller compares the current effective pressure caused by the application of the high DC voltage after a period of use of the CDG to the original effective pressure. If the current effective pressure is sufficiently different from the original effective pressure, the contamination test controller determines that the CDG is considered to be sufficiently contaminated to warrant replacement of the CDG with a new CDG. The magnitude of the difference in the effective pressure readings that is sufficient to warrant replacement of the CDG can be selected by the user in accordance with the criticality of the system in which the CDG is installed. For more critical applications, the acceptable pressure difference may be quite small such the CDG is replaced when the contamination first forms on the diaphragm and causes a small pressure difference. For less critical applications, the acceptable pressure difference may be larger to allow the contamination to build up on the diaphragm to a greater extent before replacing the CDG.

The improved system described above provides an apparatus and a method for detecting diaphragm contamination and or diaphragm coating in situ and in real time. As described above, the apparatus and method sense changes in the deflection characteristics of the diaphragm 130 caused by the presence of contamination or coating on the diaphragm. As described above, the apparatus includes circuitry (the DC voltage supply 410 and the high voltage switch 420) that introduces a precise DC voltage between the diaphragm and the capacitance measuring electrode 144 within the reference vacuum cavity on command. The electrostatic force created by this DC voltage causes the diaphragm to be attracted to the capacitance measuring electrode (or electrodes in the case of a dual electrode device). The attractive force generated by the applied DC voltage causes the diaphragm to deflect in the direction of the electrode (or electrodes), thus reducing the spacing between the diaphragm and the electrode (or electrodes). The reduced spacing results in a change in the measured capacitance. The magnitude of the deflection of an uncoated or uncontaminated diaphragm and the resultant capacitance change for any given applied DC voltage is highly repeatable.

The CDG 100 is characterized at the time of manufacture by applying a plurality of DC voltages of known magnitude between the diaphragm 130 and the fixed electrode 144 and measuring the capacitance changes caused by the deflection. The calibration and the deflection characteristics are stored in a memory of the contamination test controller 450. Once this initial characterization has been performed at the factory, the user of the device is able to perform an in-situ diaphragm diagnostic routine at any time the device is not being used to measure pressure. The diagnostic routine can be triggered by a customer-generated command. The diagnostic routine activates (e.g., switches) the large DC voltage (e.g., 300 volts) which is applied between the diaphragm and the electrode (or electrodes) to induce the static deflection of the diaphragm. While the diaphragm is thus deflected, the capacitance between the diaphragm and the electrode (or electrodes) is measured using an AC voltage in a conventional manner. The measured capacitance associated with the induced deflection is compared to the expected capacitance change as initially detected for the same DC voltage applied at the time of the original manufacture and calibration of the CDG. As a coating or other contamination develops on the diaphragm surface, the amount of deflection and the resultant measure of capacitance shift in magnitude. In particular, greater contamination or coating causes a smaller diaphragm deflection at a given applied voltage. The smaller diaphragm deflection results in a larger spacing between the diaphragm and the electrode (or electrodes), which causes the measured capacitance to be less than the measured capacitance during the calibration process. The degree to which the measured capacitance is reduced is used to determine when repair or replacement of the CDG is required. The measured capacitance is also used to monitor the deflection characteristics of the diaphragm over time. The monitored deflection characteristics enable the user of the CDG to set alarms or to establish boundary conditions in the determination of appropriate maintenance intervals.

After selected periods of actual use (e.g., after a selected number of hours or days), the high voltage switch 420 can be selectively enabled when the pressure (Px) of the system is again drawn down to the system base pressure so that the pressure at the input of the CDG is at or near the "system zero point pressure" of the CDG. The pressure is again measured by first measuring the first pressure prior to applying the DC voltage and then measuring the second pressure while applying the DC voltage. The difference between the two pressures should be within an acceptable range of the difference determined when the CDG was originally installed. As the diaphragm becomes contaminated or the diaphragm's surface becomes coated, the deflection of the diaphragm caused by the DC voltage reduces, which causes a corresponding reduction in the difference between the two measured pressures. The procedure is repeated to periodically compare the currently measured effective pressure difference to the original effective pressure difference. When the difference in the two pressure readings becomes sufficiently small to indicate that contamination or coating on the diaphragm has substantially affected the measured effective pressure difference, the CDG can be removed from service and replaced with a new CDG. It should be understood that the system does not have to be pumped down to the same absolute base pressure each time the two pressure readings are taken. Rather, as long as the system is pumped down to a current base pressure in the same range of magnitudes as the system base pressure when the CDG was first installed (e.g., around $10^{-9}$ Torr), the difference between the two pressure readings during a periodic test will accurately represent the effective pressure caused by the deflection of the diaphragm in response to the applied DC voltage.

The contamination test controller 450 of FIG. 6 is implemented in one embodiment as a microcontroller or other integrated circuitry. For example, in one embodiment, a microcontroller includes an analog input (AN IN) port 470 that receives the output signal on the output signal line 256 from the AC pressure measuring circuit 250. The microcontroller advantageously includes internal analog-to-digital conversion circuitry to convert the value on the analog input to a digital value for processing within the microcontroller. The digital output port 452 of the microcontroller provides an output signal at a first level (e.g., a logical "1") to enable the high voltage switch 420 and provides an output signal at a second level (e.g., a logical "0") to disable the high voltage switch.

The microcontroller within the contamination test controller 450 further includes a second digital output port 480, which is connected to the input 492 of a notification unit 490. The notification unit may be as simple as an LED or an audible device that is selectively activated to indicate an error, or the notification unit may be a part of overall control and display (e.g., a graphical user interface) used to control the system in which the CDG 100 is installed and to display operational parameters of the system.

The microcontroller within the contamination test controller 450 further includes internal memory for storing the pressure characteristics of the CDG 100 when initially characterized.

Figure 7:
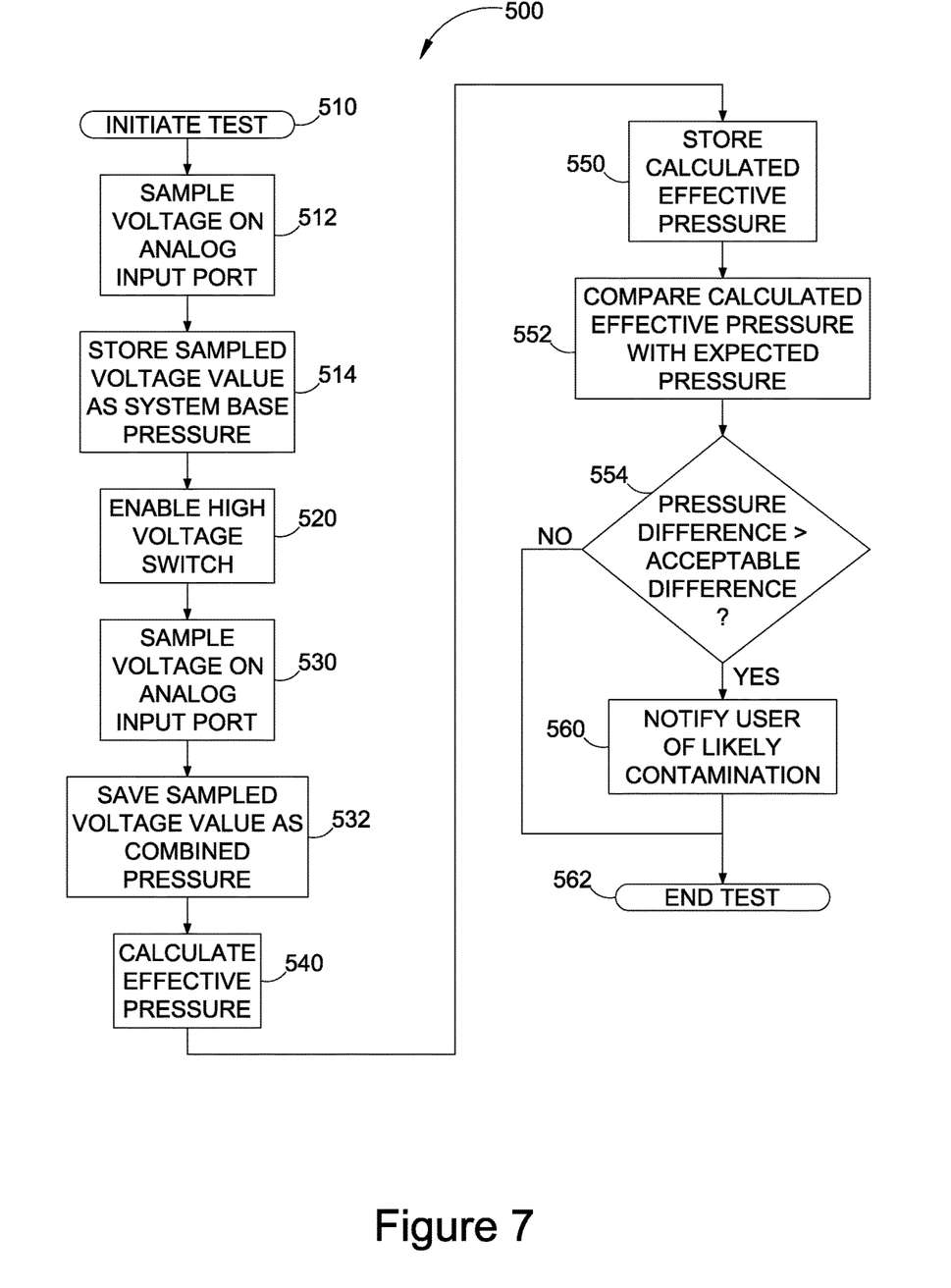
FIG. 7 illustrates a flow chart of the operation of the system of FIG. 6.

One exemplary mode of operation of the contamination test controller 450 is illustrated by a flow chart 500 in FIG. 7. Normally, the contamination test controller is off or is performing other tasks that may be related to the normal operation of the CDG 100. When the user of the CDG wants to initiate a contamination test while the pressure in the CDG is drawn down to the system base pressure, the user activates the microcontroller to perform the routine illustrated by the flow chart in FIG. 7. The microcontroller may also be activated automatically to perform the routine on a periodic basis or when certain conditions are detected.

The microcontroller within the contamination test controller 450 initiates the routine in a step 510. The microcontroller first samples the voltage on the analog input port 470 in a block 512. The microcontroller saves the sampled voltage (which is converted to a digital value) as the current "system base pressure" in a block 514. The microcontroller then activates the digital output port 452 in a block 520 to enable the high voltage switch 420 to apply the high voltage from the DC voltage supply 410 to the conductor 230. After activating the high voltage, the microcontroller again samples the voltage on the analog input port in a block 530. In a block 532, the microcontroller saves the sampled voltage as the "combined pressure" which is the sum of the "system base pressure" and the "effective pressure" caused by deflection of the diaphragm 130. Then, in a block 540, the microcontroller calculates the "effective pressure" caused by the DC voltage by subtracting the previously sampled system base pressure from the currently sampled "combined pressure." The calculated "effective pressure" is stored in a block 550. In the illustrated embodiment, in a block 552, the microcontroller compares the calculated "effective pressure" against a stored effective pressure (or expected pressure) that was saved when the DC voltage was applied to the diaphragm during the above-described calibration process to determine a pressure difference. Then, in a decision block 554, the determined pressure difference is compared to an acceptable pressure difference. If the determined pressure difference is greater than an acceptable pressure difference, the microcontroller sets an alarm or otherwise notifies the user that the CDG is likely contaminated in a block 560 (e.g., via the notification unit 490 of FIG. 6) and then ends the current test in a block 562 and waits for the next initiation of the contamination test. Otherwise if the determined pressure difference is not greater than the acceptable pressure difference, the microcontroller proceeds directly to the block 562. As discussed above, the acceptable pressure difference can be set to a magnitude in accordance with the criticality of the environment in which the CDG is installed.

Figure 8:
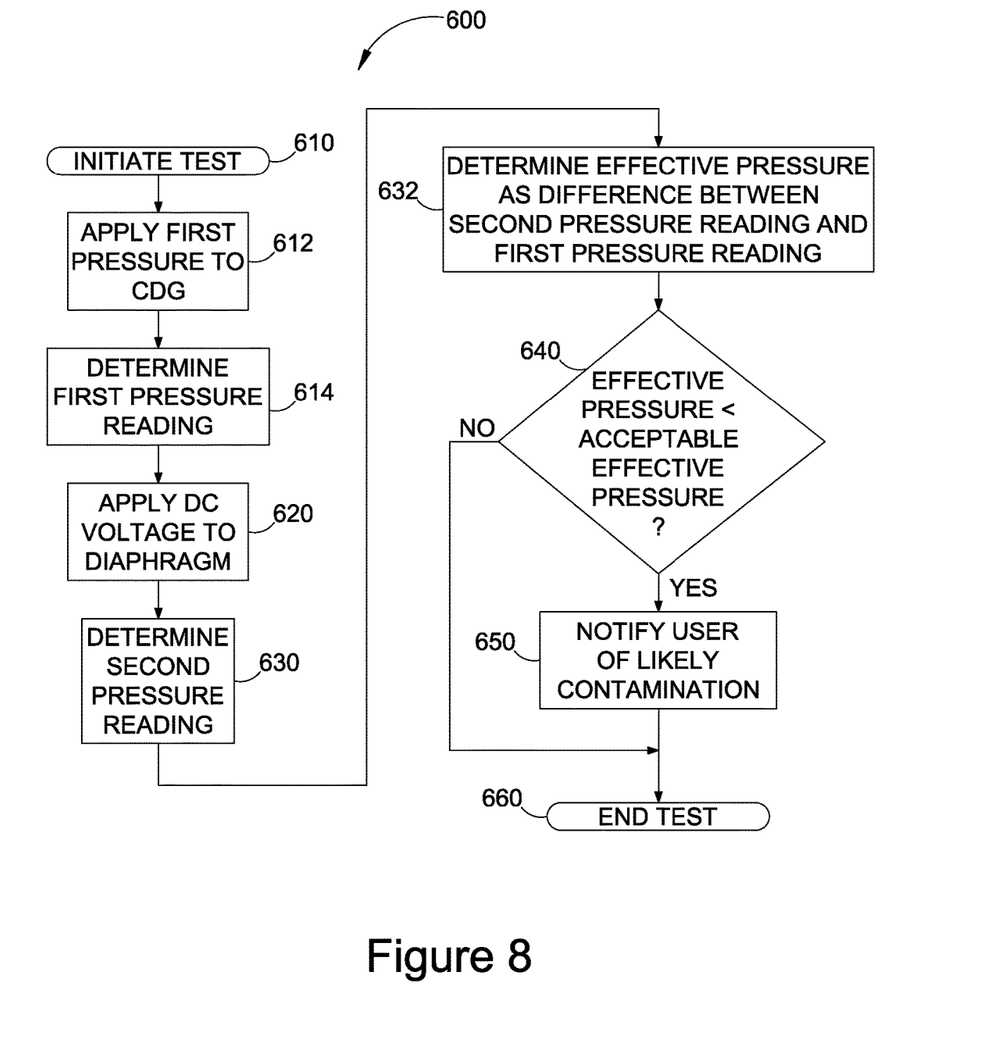
FIG. 8 illustrates a second flow chart of the operation of the system of FIG. 6.

FIG. 8 illustrates a flow chart 600 of another description of the microcontroller-implemented method of determining contamination of the CDG 100 by the contamination test controller 450. After initializing the test for contamination in a block 610, the method applies a first pressure to the CDG in a block 612. In the illustrated embodiment, the first pressure is the system base pressure as discussed above. While the first pressure is applied to the CDG, the method measures the voltage on the analog input 470 of the contamination test controller to determine a first pressure value. In a block 620, the method then applies a DC voltage between the diaphragm 130 and the fixed electrode 144 by outputting the DC control signal from the digital output port 452 of the contamination controller to the input 442 of the high voltage switch 420. The voltage from the DC voltage supply passes through the high voltage switch to the center tap 228 of the output winding 222 of the transformer 220 and thus to the diaphragm to cause the diaphragm to deflect, as described above. In a block 630, the method uses the voltage on the analog input of the contamination test controller to determine a second pressure reading. In a block 632, the method determines a difference between the second pressure reading and the first pressure reading to determine an effective pressure caused by the high voltage applied to the diaphragm. Then, in a decision block 640, the method determines whether the effective pressure (i.e., the difference in the two pressure readings) is less than an acceptable effective pressure. If the calculated effective pressure is less than an acceptable effective pressure because the contamination of the diaphragm has reduced the deflection of the diaphragm, the method notifies the user of likely contamination in a block 650 (e.g., via the notification unit 490 of FIG. 6) and then ends the test in a block 660. Otherwise, if the calculated effective pressure is at least as much as the acceptable effective pressure, the method ends the test in the block 660 without notifying the user.

As further discussed above, the contamination test controller may be programmed to perform at regular intervals or in the presence of certain conditions rather than waiting for a manual initiation by a user.

As various changes could be made in the above constructions without departing from the scope of the invention, it is intended that all the matter contained in the above description or shown in the accompanying drawings shall be interpreted as illustrative and not in a limiting sense.

What is claimed is:

1. A method for detecting contamination of the diaphragm of a capacitance diaphragm gauge (CDG) that includes a diaphragm and at least one fixed electrode wherein the capacitance between the diaphragm and the fixed electrode is responsive to a pressure applied to the CDG, the method comprising:

applying a first pressure to the CDG;

determining a first pressure value while the first pressure is applied to the CDG;

applying a DC voltage between the diaphragm and the at least one fixed electrode of the CDG to cause deflection of the diaphragm, the DC voltage applied while the first pressure is applied to the CDG;

determining a second pressure value while the DC voltage is applied between the diaphragm and the at least one fixed electrode of the CDG;

comparing the second pressure value with the first pressure value to determine a difference in pressure values resulting from the deflection caused by the applied DC voltage; and determining that the diaphragm of the CDG is contaminated when the difference in pressure values is less than an acceptable difference in pressure values.

2. The method as defined in claim 1, wherein the DC voltage applied between the diaphragm and the at least one fixed electrode of the CDG causes the diaphragm to deflect toward the at least one fixed electrode to increase the capacitance between the diaphragm and the at least one fixed electrode.

* * * * *